(12) United States Patent
Motoyoshi et al.

(10) Patent No.: US 9,096,710 B2
(45) Date of Patent: Aug. 4, 2015

(54) POLYCARBONATE RESIN

(71) Applicant: TEIJIN LIMITED, Osaka (JP)

(72) Inventors: Tetsuya Motoyoshi, Tokyo (JP); Kenta Imazato, Tokyo (JP); Katsuhiro Yamanaka, Tokyo (JP)

(73) Assignee: TEIJIN LIMITD, Osaka (JP)

( * ) Notice: Subject to any disclaimer, the term of this patent is extended or adjusted under 35 U.S.C. 154(b) by 0 days.

(21) Appl. No.: 14/363,893

(22) PCT Filed: Dec. 25, 2012

(86) PCT No.: PCT/JP2012/084261
§ 371 (c)(1),
(2) Date: Jun. 9, 2014

(87) PCT Pub. No.: WO2013/100163
PCT Pub. Date: Jul. 4, 2013

(65) Prior Publication Data

US 2014/0350208 A1 Nov. 27, 2014

(30) Foreign Application Priority Data

Dec. 27, 2011 (JP) .................................. 2011-285611
Mar. 14, 2012 (JP) .................................. 2012-057324

(51) Int. Cl.
*C08G 64/02* (2006.01)
*C08G 64/16* (2006.01)
*C08G 63/02* (2006.01)

(52) U.S. Cl.
CPC ........ *C08G 64/1608* (2013.01); *C08G 64/0208* (2013.01)

(58) Field of Classification Search
CPC .................. C08G 64/1608; C08G 64/0208
USPC ........... 502/150; 525/436; 528/196, 198, 271, 528/272
See application file for complete search history.

(56) References Cited

U.S. PATENT DOCUMENTS

| 7,365,148 | B2 * | 4/2008 | Ono et al. ...................... 528/196 |
| 2006/0149024 | A1 | 7/2006 | Ono et al. |
| 2009/0105393 | A1 | 4/2009 | Jansen et al. |
| 2010/0190953 | A1 | 7/2010 | Fuji et al. |
| 2011/0257362 | A1 | 10/2011 | Fuji et al. |

FOREIGN PATENT DOCUMENTS

| CN | 101874056 | 4/2013 |
| EP | 1 640 400 | 3/2006 |
| JP | 2003-292603 | 10/2003 |
| JP | 2008-24919 | 2/2008 |
| JP | 2010-77398 | 4/2010 |
| JP | 2010-539264 | 12/2010 |
| JP | 2011-500925 | 1/2011 |
| WO | 2004/111106 | 12/2004 |
| WO | 2009/033934 | 3/2009 |
| WO | 2009/052463 | 4/2009 |
| WO | 2009/120235 | 10/2009 |
| WO | 2010/119574 | 10/2010 |
| WO | 2011/082103 | 7/2011 |

OTHER PUBLICATIONS

International Search Report issued Apr. 16, 2013, in International (PCT) Application No. PCT/JP2012/084261.
International Preliminary Report on Patentability issued Jul. 1, 2014 in International (PCT) Application PCT/JP2012/084261.
European Search Report issued Apr., 13, 2015 in corresponding European Application No. 12862667.8.

\* cited by examiner

*Primary Examiner* — Terressa Boykin
(74) *Attorney, Agent, or Firm* — Wenderoth, Lind & Ponack, L.L.P.

(57) ABSTRACT

A polycarbonate resin which is excellent in heat resistance, boiling water resistance and surface hardness and has a low water absorption coefficient. The polycarbonate resin comprises a unit (A) represented by the following formula and a unit (B) represented by the following formula as main recurring units, wherein the molar ratio (A/B) of the unit (A) to the unit (B) is 30/70 to 99/1.

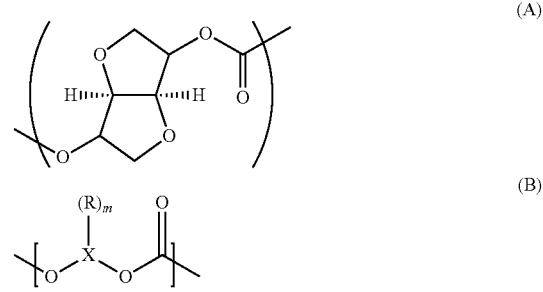

In the above formula, X is an alkylene group having 3 to 20 carbon atoms or cycloalkylene group having 3 to 20 carbon atoms, R is an alkyl group having 1 to 20 carbon atoms or cycloalkyl group having 3 to 20 carbon atoms, and "m" is an integer of 1 to 10.

13 Claims, No Drawings

POLYCARBONATE RESIN

TECHNICAL FIELD

The present invention relates to a polycarbonate resin which is excellent in heat resistance, boiling water resistance and surface hardness and has a low water absorption coefficient.

BACKGROUND ART

Biomass resources which do not depend on oil as a raw material and effect carbon neutral that they do not increase the amount of carbon dioxide even when they are burnt are attracting a lot of attention due to problems such as concern about the depletion of oil resources and an increase in the amount of carbon dioxide in air which causes global warming. In the field of polymers, the development of biomass plastics produced from the biomass resources is now actively under way.

A typical example of the biomass plastics is polylactic acid. Since it has relatively high heat resistance and mechanical properties out of the biomass plastics, its use is spreading to dishes, packaging materials and miscellaneous goods, and further the potential of using it as an industrial material is now under study.

However, for use of polylactic acid as an industrial material, its heat resistance is not satisfactory and when a molded article thereof is to be obtained by injection molding having high productivity, it is inferior in moldability as its crystallinity is low as a crystalline polymer.

A polycarbonate resin which is produced from a raw material obtained from an ether diol residue able to be produced from sugar is under study as an amorphous polycarbonate resin obtained from a biomass resource and having high heat resistance. Especially, studies are being made to mainly use isosorbide as a monomer so as to incorporate it into a polycarbonate. There are proposed polycarbonate resins having excellent heat resistance and moldability which is prepared by copolymerizing isosorbide with an aliphatic dihydroxy compound (Patent Document 1 and Patent Document 2). However, as a polycarbonate resin containing isosorbide has a high water absorption coefficient, a dimensional change or warp occurs in a molded article thereof by water absorption. Use of this polycarbonate resin is limited in application fields such as disk materials, optical pick-up lenses and connectors used in optical systems thereof, and sheets whose warp by water absorption causes a problem, in which high-accuracy dimensional stability is required, and molded articles for use in an environment where water absorption and drying are repeated for a long time. Therefore, a resin having a low water absorption coefficient and high heat resistance is desired. Since packaging materials which are used to package food, medical and pharmaceutical goods and precision electronic parts must undergo boiling disinfection and pressure/heat sterilization, a resin having high boiling water resistance is desired.

Further, polycarbonate polymers containing an isosorbide unit, a $C_{14-49}$ aliphatic diacid unit and a $C_{19-44}$ aliphatic diol unit are disclosed (Patent Document 3, Patent Document 4). However, since these polycarbonate polymers have an extremely large number of main-chain carbon chains, HDT (deflection temperature under load) lowers.

(Patent Document 1) WO2004/111106
(Patent Document 2) JP-A 2008-24919
(Patent Document 3) JP-A 2011-500925
(Patent Document 4) WO2011/082103

DISCLOSURE OF THE INVENTION

It is an object of the present invention to provide a polycarbonate resin which is excellent in heat resistance, boiling water resistance and surface hardness and has a low water absorption coefficient.

The inventors of the present invention conducted intensive studies and found that the water absorption coefficient can be greatly reduced by controlling the number of main-chain carbon atoms and the number of side-chain carbon atoms of a comonomer. The present invention was accomplished based on this finding.

That is, the present invention is a polycarbonate resin comprising a unit (A) represented by the following formula and a unit (B) represented by the following formula as main recurring units, wherein the molar ratio (A/B) of the unit (A) to the unit (B) is 30/70 to 99/1.

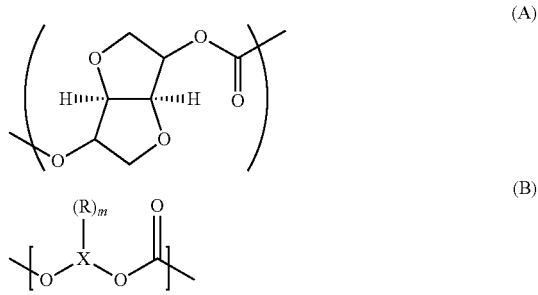

(In the above formula, X is an alkylene group having 3 to 20 carbon atoms or cycloalkylene group having 3 to 20 carbon atoms, R is an alkyl group having 1 to 20 carbon atoms or cycloalkyl group having 3 to 20 carbon atoms, and "m" is an integer of 1 to 10.)

BEST MODE FOR CARRYING OUT THE INVENTION

The present invention will be described in detail hereinunder. The polycarbonate resin of the present invention comprises a unit (A) and a unit (B) as main recurring units.

(Unit (A))

Examples of the unit (A) are units (A1), (A2) and (A3) represented by the following formulas which are stereoisomeric to one another.

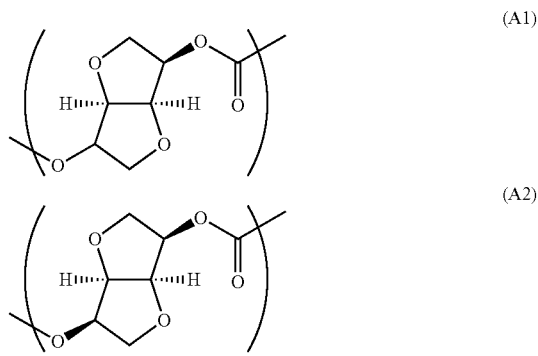

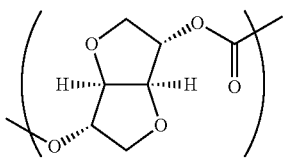

(A3)

They are units derived from sugar-derived ether diols, obtained from the biomass of the natural world and called "renewable resources". The units (A1), (A2) and (A3) are derived from isosorbide, isomannide and isoidide, respectively. Isosorbide is obtained by hydrogenating D-glucose obtained from starch and dehydrating the obtained product. The other ether diols are obtained from similar reactions to the above reaction except for the starting material. The unit derived from isosorbide (1,4;3,6-dianhydro-D-sorbitol) is particularly preferred because it is easily produced and has excellent heat resistance.

(Unit (B))

The unit (B) is a unit derived from an aliphatic diol having a side-chain alkyl group or a side-chain cycloalkyl group.

The unit (B) has a total number of carbon atoms of preferably 4 to 12, more preferably 5 to 10. Within the above range, HDT (deflection temperature under load) of the polycarbonate resin is kept high.

The number of carbon atoms of X (number of main-chain carbon atoms) and the total number of carbon atoms of R's (number of side-chain carbon atoms) of the unit (B) satisfy preferably the following expression (i), more preferably the following expression (i-a), much more preferably the following expression (i-b). When the following expression (i) is satisfied, boiling water resistance becomes high and the water absorption coefficient can be greatly reduced advantageously.

0.3≤(number of main-chain carbon atoms)/(number of side-chain carbon atoms)≤8     (i)

0.4≤(number of main-chain carbon atoms)/(number of side-chain carbon atoms)≤5     (i-a)

0.5≤(number of main-chain carbon atoms)/(number of side-chain carbon atoms)≤2     (i-b)

(X in Unit (B))

In the above formula (B), X is an alkylene group having 3 to 20 carbon atoms or cycloalkylene group having 3 to 20 carbon atoms.

X is an alkylene group having preferably 3 to 12, more preferably 3 to 8, much more preferably 3 to 6 carbon atoms. Examples of the alkylene group include propylene group, butylene group, pentylene group, hexylene group, heptylene group and octylene group.

X is a cycloalkylene group having preferably 3 to 12, more preferably 3 to 8, much more preferably 3 to 6 carbon atoms. Examples of the cycloalkylene group include cyclopropylene group, cyclobutylene group, cyclopentylene group, cyclohexylene group, cycloheptylene group and cyclooctylene group.

(R in Unit (B))

In the formula (B), R is an alkyl group having 1 to 20 carbon atoms or cycloalkyl group having 3 to 20 carbon atoms.

R is an alkyl group having preferably 1 to 12, more preferably 1 to 8 carbon atoms. Examples of the alkyl group include methyl group, ethyl group, propyl group, butyl group, pentyl group, hexyl group, heptyl group and octyl group.

R is a cycloalkyl group having preferably 3 to 12, more preferably 3 to 8 carbon atoms. Examples of the cycloalkyl group include cyclopropyl group, cyclobutyl group, cyclopentyl group, cyclohexyl group, cycloheptyl group and cyclooctyl group.

("m" in Unit (B))

In the formula (B), "m" is an integer of 1 to 10, preferably 2 to 8, more preferably 2 to 5.

(when X in unit (B) is an alkylene group having 3 to 20 carbon atoms)

Preferably, in the unit (B), X is an alkylene group having 3 to 20 carbon atoms, R is an alkyl group having 1 to 4 carbon atoms, and "m" is an integer of 2 to 8. More preferably, in the unit (B), X is an alkylene group having 3 to 5 carbon atoms, R is an alkyl group having 1 to 4 carbon atoms, and "m" is an integer of 1 to 2.

The unit (B) is preferably a unit (Ba) represented by the following formula.

(Ba)

"n" is an integer of 2 to 6, preferably 3 to 5. An "n" number of $R_a$'s are each independently selected from hydrogen atom and alkyl group having 1 to 4 carbon atoms. An "n" number of $R_b$'s are each independently selected from hydrogen atom and alkyl group having 1 to 4 carbon atoms. Preferably, one or two of an "n" number of $R_a$'s and an "n" number of $R_b$'s are alkyl groups having 1 to 4 carbon atoms and the other are hydrogen atoms.

—X{—(R)$_m$}— in the unit (B) is preferably a 2-n-butyl-2-ethyl-1,3-propanediyl group, 2,4-diethyl-1,5-pentanediyl group or 3-methyl-1,5-pentanediyl group.

(when X in unit (B) is a cycloalkylene group having 3 to 20 carbon atoms)

Preferably, in the above formula (B), X is a cycloalkylene group having 4 to 5 carbon atoms, R is an alkyl group having 1 to 10 carbon atoms, and "m" is an integer of 3 to 12.

The unit (B) is preferably a unit (B1) represented by the following formula.

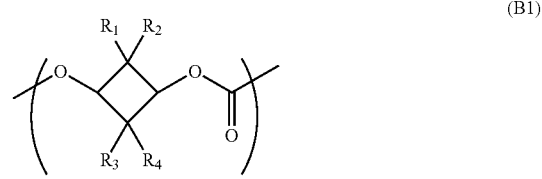

(B1)

$R_1$, $R_2$, $R_3$ and $R_4$ are alkyl groups which may be the same or different, the total number of carbon atoms of $R_1$ to $R_4$ is 4 to 10, and $R_1$ and $R_2$, and $R_3$ and $R_4$ may be bonded together to form a carbon ring. $R_1$, $R_2$, $R_3$ and $R_4$ in the unit (B1) are preferably each independently a methyl group, ethyl group or propyl group.

The unit (B) is preferably a unit (B2) represented by the following formula.

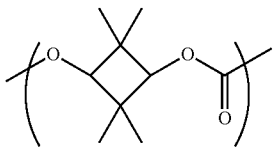
(B2)

(Composition)

The polycarbonate resin of the present invention comprises the unit (A) and the unit (B) as main recurring units. When it has an isosorbide component as the unit (A), it can have high heat resistance while it has a biomass resource and further a reduced water absorption coefficient when it has a branched diol as the unit (B).

In consideration of balance among heat resistance, low water absorption coefficient, boiling water resistance and surface hardness, the molar ratio (A/B) of the unit (A) to the unit (B) is 30/70 to 99/1. When the molar ratio (A/B) is 30/70 to 99/1, pencil hardness is high, the water absorption coefficient is low, and moldability is satisfactory.

The molar ratio (A/B) of the unit (A) to the unit (B) is preferably 60/40 to 95/5, more preferably 70/30 to 90/10, much more preferably 75/25 to 90/10 and particularly preferably 80/20 to 90/10. When the molar ratio (A/B) is lower than 30/70, the content of biogenic matter becomes low and when the molar ratio (A/B) is higher than 99/1, the water absorption coefficient becomes high and flowability degrades.

In the present invention, the main recurring unit accounts for not less than 60 mol %, preferably not less than 70 mol %, more preferably not less than 80 mol % based on the total of all the recurring units. The molar ratio of the recurring units can be calculated by measuring with the proton NMR of the JNM-AL400 of JEOL Ltd.

The unit (A) is derived from an aliphatic diol having an ether group. Out of biomass resources, diols having an ether bond have high heat resistance and high pencil hardness. Examples of the aliphatic diol having an ether group are isosorbide, isomannide and isoidide which are stereoisomeric to one another.

The unit (B) is derived from an aliphatic diol having a side-chain alkyl group or a side-chain cycloalkyl group. Examples of the aliphatic diol having a side-chain alkyl group or a side-chain cycloalkyl group include 1,3-butylene glycol, 2-methyl-1,3-propanediol, neopentyl glycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexane glycol, 1,2-octyl glycol, 2-ethyl-1,3-hexanediol, 2,3-diisobutyl-1,3-propanediol, 1,12-octadecanediol, 2,2-diisoamyl-1,3-propanediol, 2-methyl-2-propyl-1,3-propanediol, 2-cyclohexyl-1,3-propanediol, 2-methyl-1,4-cyclohexane dimethanol and 2,2,4,4-tetramethyl-1,3-cyclobutanediol.

Out of these, 3-methyl-1,5-pentanediol, 2-n-butyl-2-ethyl-1,3-propanediol, 2,2-diethyl-1,3-propanediol and 2,4-diethyl-1,5-pentanediol are preferred, and 2-n-butyl-2-ethyl-1,3-propanediol and 2,4-diethyl-1,5-pentanediol are particularly preferred. They may be used in combination of two or more.

A diol compound deriving a unit other than the unit (A) and the unit (B) may be anyone of aliphatic diol compound, alicyclic diol compound or aromatic dihydroxy compound. Examples thereof are diol compounds described in WO2004/111106 and WO2011/021720 and oxyalkylene glycols such as diethylene glycol, triethylene glycol, tetraethylene glycol and polyethylene glycol.

The aliphatic dihydroxy compound is preferably at least one dihydroxy compound selected from the group consisting of 1,3-propanediol, 1,4-butanediol, 1,5-pentanediol, 1,6-hexanediol, 1,8-octanediol, 1,9-nonanediol, 1,10-decanediol and 1,12-dodecanediol.

The alicyclic dihydroxy compound is preferably at least one dihydroxy compound selected from the group consisting of cyclohexane dimethanol, tricyclodecane dimethanol, adamantanediol, pentacyclopentadecane dimethanol and 3,9-bis(2-hydroxy-1,1-dimethylethyl)-2,4,8,10-tetraoxaspiro[5.5]undecane.

The aromatic dihydroxy compound is preferably at least one dihydroxy compound selected from the group consisting of bisphenol M, 9,9-bis(4-hydroxy-3-methylphenyl)fluorene, 1,1-bis(4-hydroxyphenyl)cyclohexane, 1,1-bis(4-hydroxyphenyl)-3,3,5-trimethyl cyclohexane, 4,4'-dihydroxy-3,3'-dimethyldiphenyl sulfide, bisphenol A, bisphenol C, bisphenol AF and 1,1-bis(4-hydroxyphenyl)decane.

(Production Process of Polycarbonate Resin)

The polycarbonate resin of the present invention is produced by reaction means known per se for producing an ordinary polycarbonate resin, for example, reacting a diol component with a carbonate precursor such as diester carbonate. A brief description is subsequently given of basic means for these production processes.

A transesterification reaction using a diester carbonate as the carbonate precursor is carried out by a method in which a predetermined amount of an aromatic dihydroxy component and a predetermined amount of the diester carbonate are stirred in an inert gas atmosphere under heating and the formed alcohol or phenol is distilled off. The reaction temperature which differs according to the boiling point of the formed alcohol or phenol is generally 120 to 350° C. The reaction is carried out under reduced pressure from the beginning and completed while the formed alcohol or phenol is distilled off. An end-sealing agent or an antioxidant may be added as required.

The diester carbonate used in the transesterification reaction is an ester such as aryl group or aralkyl group having 6 to 12 carbon atoms which may be substituted. Examples thereof include diphenyl carbonate, ditolyl carbonate, bis(chlorophenyl)carbonate and m-cresyl carbonate. Out of these, diphenyl carbonate is particularly preferred. The amount of diphenyl carbonate is preferably 0.97 to 1.10 moles, more preferably 1.00 to 1.06 moles based on 1 mole of the total of dihydroxy compounds.

To accelerate the polymerization rate in the melt polymerization process, a polymerization catalyst may be used, as exemplified by alkali metal compounds, alkali earth metal compounds, nitrogen-containing compounds and metal compounds.

Organic acid salts, inorganic salts, oxides, hydroxides, hydrides, alkoxides and quaternary ammonium hydroxides of an alkali metal or alkali earth metal are preferably used as these compounds. These compounds may be used alone or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salts, dipotassium salts, dicesium salts and dilithium salts of bisphenol A, and sodium salts, potassium salts, cesium salts and lithium salts of phenol.

Examples of the alkali earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of the nitrogen-containing compound include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. Tertiary amines such as triethylamine, dimethylbenzylamine and triphenylamine, and imidazoles such as 2-methylimidazole, 2-phenylimidazole and benzimidazole are also included. Bases and basic salts such as ammonia, tetramethylammonium borohydride, tetrabutylammonium borohydride, tetrabutylammonium tetraphenyl borate and tetraphenylammonium tetraphenyl borate are further included.

Examples of the metal compound include zinc aluminum compounds, germanium compounds, organic tin compounds, antimony compounds, manganese compounds, titanium compounds and zirconium compounds. They may be used alone or in combination of two or more.

The amount of the polymerization catalyst is preferably $1 \times 10^{-9}$ to $1 \times 10^{-2}$ equivalent, more preferably $1 \times 10^{-8}$ to $1 \times 10^{-2}$ equivalent and much more preferably $1 \times 10^{-7}$ to $1 \times 10^{-3}$ equivalent based on 1 mole of the diol component.

A catalyst deactivator may be added in the latter stage of the reaction. Known catalyst deactivators are effectively used as the catalyst deactivator in use. Out of these, ammonium salts and phosphonium salts of a sulfonic acid are preferred. Salts of dodecylbenzenesulfonic acid such as tetrabutylphosphonium salts of dodecylbenzenesulfonic acid and salts of paratoluenesulfonic acid such as tetrabutylammonium salts of paratoluenesulfonic acid are more preferred.

Methyl benzene sulfonate, ethyl benzene sulfonate, butyl benzene sulfonate, octyl benzene sulfonate, phenyl benzene sulfonate, methyl paratoluene sulfonate, ethyl paratoluene sulfonate, butyl paratoluene sulfonate, octyl paratoluene sulfonate and phenyl paratoluene sulfonate are preferably used as esters of a sulfonic acid. Out of these, tetrabutyl phosphonium salts of dodecylbenzene sulfonic acid are most preferably used.

The amount of the catalyst deactivator, when at least one polymerization catalyst selected from alkali metal compounds and/or alkali earth metal compounds is used, is preferably 0.5 to 50 moles, more preferably 0.5 to 10 moles and much more preferably 0.8 to 5 moles based on 1 mole of the catalyst.

The terminal structure of the obtained polycarbonate resin is a hydroxyl group or diester carbonate residue. A terminal group may be introduced into the polycarbonate resin of the present invention separately as long as its characteristic properties are not impaired. The terminal group can be introduced by adding a monohydroxy compound during polymerization. A hydroxyl compound represented by the following formula (2) or (3) is preferably used as the monohydroxy compound.

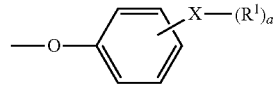

In the above formulas (2) and (3), $R^1$ is an alkyl group having 4 to 30 carbon atoms, aralkyl group having 7 to 30 carbon atoms, perfluoroalkyl group having 4 to 30 carbon atoms or group represented by the following formula (4),

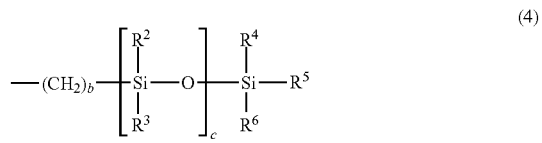

preferably an alkyl group having 4 to 20 carbon atoms, perfluoroalkyl group having 4 to 20 carbon atoms or group represented by the above formula (4), and particularly preferably an alkyl group having 8 to 20 carbon atoms or group represented by the above formula (4).

X is preferably at least one bond selected from the group consisting of single bond, ether bond, thioether bond, ester bond, amino bond and amide bond, more preferably at least one bond selected from the group consisting of single bond, ether bond and ester bond, and particularly preferably a single bond or ester bond. "a" is an integer of 1 to 5, preferably 1 to 3 and particularly preferably 1.

In the above formula (4), $R^2$, $R^3$, $R^4$, $R^5$ and $R^6$ are each independently at least one group selected from the group consisting of alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, preferably each independently at least one group selected from the group consisting of alkyl group having 1 to 10 carbon atoms and aryl group having 6 to 10 carbon atoms, and particularly preferably at least one group selected from the group consisting of methyl group and phenyl group. "b" is an integer of 0 to 3, preferably 1 to 3 and particularly preferably 2 to 3. "c" is an integer of 4 to 100, preferably 4 to 50 and particularly preferably 8 to 50.

The monohydroxy compound used in the present invention is preferably a raw material obtained from renewable resources such as plants. Examples of the monohydroxy compound obtained from plants include long-chain alkyl alcohols having 14 or more carbon atoms obtained from vegetable oils (cetanol, stearyl alcohol, behenyl alcohol).

(Specific Viscosity: $\eta_{sp}$)

The specific viscosity ($\eta_{sp}$) of the polycarbonate resin of the present invention is preferably 0.2 to 1.5. When the specific viscosity is 0.2 to 1.5, strength and moldability become high. The specific viscosity is more preferably 0.2 to 1.2, much more preferably 0.2 to 1.0. When the specific viscosity of the polycarbonate resin is lower than 0.2, the strength of a molded piece obtained by injection molding tends to degrade and when the specific viscosity is higher than 1.5, moldability tends to degrade at the time of injection molding.

The specific viscosity as used in the present invention is obtained from a solution prepared by dissolving 0.7 g of the polycarbonate resin in 100 ml of methylene chloride at 20° C. by using an Ostwald viscometer.

Specific viscosity($\eta_{sp}$)=$(t-t_0)/t_0$

[$t_0$ is the number of seconds required for the dropping of methylene chloride and t is the number of seconds required for the dropping of a sample solution]

The measurement of the specific viscosity can be carried out as follows. The polycarbonate resin is first dissolved in methylene chloride in a weight ratio of 1:20 to 1:30, soluble matter is collected by cerite filtration, the solvent is removed, and solid matter is dried completely so as to obtain a methylene chloride-soluble solid. The specific viscosity at 20° C. of a solution prepared by dissolving 0.7 g of the solid in 100 ml of methylene chloride is obtained by using an Ostwald viscometer.

(Glass Transition Temperature: Tg)

The glass transition temperature (Tg) of the polycarbonate resin of the present invention is preferably 70 to 160° C., more preferably 70 to 150° C., much more preferably 80 to 140° C., particularly preferably 90 to 130° C. and most preferably 100 to 130° C. When Tg is 70 to 160° C. and an optical molded article of the polycarbonate resin is used, heat-resistant stability and moldability are high advantageously. When the glass transition temperature (Tg) of the polycarbonate resin is lower than 70° C., the heat resistance of a molded piece becomes unsatisfactory, and when the glass transition temperature is higher than 160° C., moldability at the time of injection molding tends to degrade. The glass transition temperature (Tg) is measured at a temperature elevation rate of 20° C./min by using the 2910 DSC of TA Instruments Japan.

(Deflection Temperature Under Load: HDT)

The deflection temperature under load (HDT) of the polycarbonate resin of the present invention is preferably 82 to 150° C., more preferably 85 to 140° C. and much more preferably 90 to 130° C. When the deflection temperature under load is 82 to 150° C., heat-resistant stability at the time of using a molded article of the polycarbonate resin becomes preferred and the molded article hardly deforms when it is used at a high temperature. When the deflection temperature under load of the polycarbonate resin of the present invention is lower than 82° C., heat resistance becomes unsatisfactory and it is difficult to use it at a high temperature. When the deflection temperature under load is higher than 150° C., moldability at the time of injection molding tends to degrade.

(Pencil Hardness)

Preferably, the polycarbonate resin of the present invention has a pencil hardness of F to 4H. The pencil hardness is more preferably H or higher and much more preferably 2H or higher as the polycarbonate resin is excellent in scratch resistance. When the polycarbonate resin has a pencil hardness of 4H or lower, it has a satisfactory function. The pencil hardness can be raised by increasing the content of the unit (B) based on the total of all the recurring units. In the present invention, the pencil hardness is such hardness that when the resin of the present invention is rubbed with a pencil having specific pencil hardness, no scratch is made, and pencil hardness used in the surface hardness test of a film which can be measured in accordance with JIS K-5600 is preferably used as an index. The pencil hardness becomes lower in the order of 9H, 8H, 7H, 6H, 5H, 4H, 3H, 2H, H, F, HB, B, 2B, 3B, 4B, 5B and 6B, 9H is hardest, and 6b is the softest.

(Water Absorption Coefficient (Wa))

The water absorption coefficient (Wa) of the polycarbonate resin of the present invention is preferably not more than 2.5%, more preferably not more than 2.2%. When the water absorption coefficient is not more than 2.2%, the dimensional change and warp by water absorption of a molded article of the polycarbonate resin can be reduced advantageously.

(TW Value)

The relationship between the glass transition temperature (Tg, ° C.) and the water absorption coefficient (Wa, %) of the polycarbonate resin of the present invention satisfies preferably the following expression (ii), more preferably the following expression (ii-a). When the following expression (ii) is satisfied, a polycarbonate resin having excellent heat resistance and a low water absorption coefficient is obtained advantageously. Although the upper limit of TW value is not particularly limited, a TW value of not more than 10 suffices.

$2.5 \leq$ TW value=Tg×0.04−Wa (ii)

$2.6 \leq$ TW value=Tg×0.04−Wa (ii-a)

(Photoelastic Constant)

The polycarbonate resin of the present invention has a photoelastic constant absolute value of preferably not more than $30 \times 12$ Pa$^{-1}$, more preferably not more than $25 \times 10^{-12}$ Pa$^{-1}$, much more preferably not more than $20 \times 10^{-12}$ Pa$^{-1}$ and particularly preferably not more than $15 \times 10^{-12}$ Pa$^{-1}$. When the absolute value is larger than $30 \times 10^{-12}$ Pa$^{-1}$, birefringence becomes large by stress and "optical penetration" tends to occur when the obtained film is used as a phase difference film.

(Phosphorus-based Stabilizer)

The polycarbonate resin of the present invention preferably contains a heat stabilizer to obtain good hue and stable flowability. The heat stabilizer is preferably a phosphorus-based stabilizer. A pentaerythritol type phosphite compound represented by the following formula (5) is preferred as the phosphorus-based stabilizer.

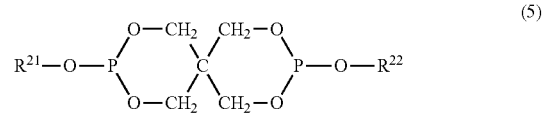

(5)

[In the above formula, $R^{21}$ and $R^{22}$ are each a hydrogen atom, alkyl group having 1 to 20 carbon atoms, aryl group or alkylaryl group having 6 to 20 carbon atoms, aralkyl group having 7 to 30 carbon atoms, cycloalkyl group having 4 to 20 carbon atoms, or 2-(4-oxyphenyl)propyl-substituted aryl group having 15 to 25 carbon atoms. The cycloalkyl group and the aryl group may be substituted by an alkyl group.]

Examples of the pentaerythritol type phosphite compound include distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl) pentaerythritol diphosphite and dicyclohexyl pentaerythritol diphosphite. Distearyl pentaerythritol diphosphite and bis(2,4-di-tert-butylphenyl)pentaerythritol diphosphite are preferred.

The other phosphorus-based stabilizers include phosphite compounds other than the above compounds, phosphate compounds, phosphonite compounds and phosphonate compounds.

The phosphite compounds include triphenyl phosphite, tris (nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite and tris(2,6-di-tert-butylphenyl)phosphite.

The other phosphite compounds which react with a dihydric phenol and have a cyclic structure may also be used. The phosphite compounds include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite and 2,2'-ethylidenebis(4-methyl-6-tert-butylphenyl)(2-tert-butyl-4-methylphenyl)phosphite.

The phosphate compounds include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Triphenyl phosphate and trimethyl phosphate are preferred.

The phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenylphosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are more preferred. The phosphonite compound may be and is preferably used in combination with the above phosphite compound having an aryl group substituted by two or more alkyl groups.

The phosphonate compounds include dimethyl benzene phosphonate, diethyl benzene phosphonate and dipropyl benzene phosphonate.

The phosphorus-based stabilizers may be used alone or in combination of two or more. At least a pentaerythritol type phosphite compound is preferably used in an effective amount. The phosphorus-based stabilizer is used in an amount of preferably 0.001 to 1 part by weight, more preferably 0.01 to 0.5 part by weight and much more preferably 0.01 to 0.3 part by weight based on 100 parts by weight of the polycarbonate resin.

(Other Additives)

Various types of particles may be added to the polycarbonate resin of the present invention according to purpose and use. The particles to be added are not particularly limited if they are inactive to the polycarbonate resin of the present invention, and examples thereof include inorganic particles, organic particles, crosslinked polymer particles, and internal particles produced in the polymerization system. Two or more of these particles may be added. The amount of the particle is preferably 0.01 to 10 wt %, more preferably 0.05 to 3 wt % based on the total weight of the polycarbonate resin.

The polycarbonate resin of the present invention may be optionally mixed with additives such as another heat stabilizer, a plasticizer, an optical stabilizer, a polymerization metal inactivating agent, a flame retardant, a lubricant, an antioxidant, a surfactant, an antimicrobial agent, an ultraviolet absorbent and a release agent according to use. The polycarbonate resin of the present invention may be used in combination with another resin as long as the effect of the present invention is not impaired.

<Molded Article>

A molded article of the polycarbonate resin of the present invention is formed by an arbitrary method such as injection molding, compression molding, extrusion molding or solution casting. Since the polycarbonate resin of the present invention has excellent moldability and heat resistance, it can be used as various molded articles. It can be advantageously used as a molded article suitable for use as structural materials for optical parts such as optical lenses, optical disks, liquid crystal panels, optical cards, sheets, films, optical fibers, connectors, deposition plastic reflective mirrors and displays, electric and electronic parts for the exteriors and front panels of personal computers and cell phones, automobile applications such as headlamps and auto windows, or functional materials.

<Film>

A film formed from the polycarbonate resin of the present invention is used as an optical film such as a surface protective film, decorative film, front panel, phase difference film, ?? substrate film, polarizer protective film, antireflection film, luminance increment film, protective film for optical disks or diffusion film.

As the process for producing an optical film, for example, known processes such as solution casting, melt extrusion, thermal pressing and calendaring processes may be used. Out of these, solution casting and melt extrusion processes are preferred, and a melt extrusion process is particularly preferred from the viewpoint of productivity.

In the melt extrusion process, preferably, a T die is used to extrude the resin and supply it to a cooling roll. The resin temperature at this point which is determined from the molecular weight, Tg and melt flow characteristics of the polycarbonate resin is 180 to 350° C., preferably 200 to 320° C. When the resin temperature is lower than 180° C., viscosity becomes high, whereby the orientation and stress-strain of the polymer tend to remain disadvantageously. When the resin temperature is higher than 350° C., problems such as heat deterioration, coloration and a die line from the T die tend to occur.

Further, since the polycarbonate resin of the present invention has high solubility in an organic solvent, the solution casting process may also be employed. In the case of the solution casting process, methylene chloride, 1,2-dichloroethane, 1,1,2,2-tetrachloroethane, dioxolan and dioxane are preferably used as the solvent. The content of the residual solvent in the film obtained by the solution casting process is preferably not more than 2 wt %, more preferably not more than 1 wt %. When the content of the residual solvent is higher than 2 wt %, the glass transition temperature of the film greatly drops, which is not preferred from the viewpoint of heat resistance.

The thickness of an unstretched film formed from the polycarbonate resin of the present invention is preferably 30 to 400 μm, more preferably 40 to 300 μm. To obtain a phase difference film by further stretching this unstretched film, the thickness of the phase difference film may be suitably determined in consideration of the desired phase difference value and thickness of an optical film so that it can fall within the above range.

EXAMPLES

The following examples are provided for the purpose of further illustrating the present invention but are in no way to be taken as limiting. "Parts" in the examples means "parts by weight".

Examples 1 to 7 and Comparative Examples 1 to 5

The resins and the evaluation methods used in Examples 1 to 7 and Comparative Examples 1 to 5 are as follows.
1. Polymer Composition Ratio (NMR)

The recurring units were measured by the proton NMR of the JNM-AL400 of JEOL Ltd. to calculate the polymer composition ratio (molar ratio).
2. Measurement of Specific Viscosity The specific viscosity was obtained from a solution prepared by dissolving 0.7 g of the polycarbonate resin in 100 ml of methylene chloride at 20° C. by using an Ostwald viscometer.

Specific viscosity$(\eta_{sp})=(t-t_0)/t_0$

[$t_0$ is the number of seconds required for the dropping of methylene chloride and t is the number of seconds required for the dropping of a sample solution]
3. Measurement of Glass Transition Temperature (Tg)

8 mg of the polycarbonate resin was used to measure its glass transition temperature in a nitrogen atmosphere (nitrogen flow rate: 40 ml/min) and a temperature elevation rate of 20° C./min by using the DSC-2910 thermal analyzing system of TA Instruments in accordance with JIS K7121.
4. Measurement of Deflection Temperature Under Load (HDT)

A pellet of the polycarbonate resin was formed at a cylinder temperature of 230° C., a mold temperature of 90° C. and a molding cycle of 40 seconds by means of an injection molding machine (J75EIII of The Japan Steel Works, Ltd.) to mold a flexural test specimen (size: 80 mm in length×10 mm in width×4 mm in thickness) which was kept at a temperature of 23° C. and a relative humidity of 50% for 24 hours so as to measure its deflection temperature under a load of 1.80 MPa in accordance with ISO75-1 and 75-2.
5. Water Absorption Coefficient (Wa)

The water absorption coefficient was obtained from the following equation by measuring an increase in the weight of a cast film obtained by dissolving a pellet of the polycarbonate resin in methylene chloride and evaporating methylene chloride after it was dried at 100° C. for 12 hours and then immersed in 25° C. water for 72 hours.

Water absorption coefficient(%)=weight of resin after water absorption×100/weight of resin before water absorption 7. TW Value The TW value was obtained from the following equation.

TW value=glass transition temperature(Tg)×0.04−water absorption coefficient(Wa)

8. Boiling Water Resistance Test

The pellet was molded into a 2 mm-thick plate at a cylinder temperature of 250° C., a mold temperature of 80° C. and a one-minute cycle by means of the J85-ELIII injection molding machine of The Japan Steel Works, Ltd. A pressure cooker test (exposure in a steam atmosphere at a temperature of 105° C. for 1 hour) was carried out on this molded plate to evaluate its appearance after the pressure cooker test. The boiling water resistance was evaluated as X when the molded plate became white or deformed significantly, Δ when the molded plate was slightly whitened or deformed, and ○ when whitening and deformation were not seen.
9. Pencil Hardness The pellet was molded into a 2 mm-thick square plate at a cylinder temperature of 250° C., a mold temperature of 80° C. and a one-minute cycle by using the J85-ELIII injection molding machine of The Japan Steel Works, Ltd. so as to measure its pencil hardness in accordance with ?? testing method specified in JIS K5600.

Example 1

<Production of Polycarbonate Resin>

426 parts of isosorbide (to be abbreviated as ISS hereinafter), 83 parts of 2-n-butyl-2-ethyl-1,3-propanediol (to be abbreviated as BEPD hereinafter), 750 parts of diphenyl carbonate (to be abbreviated as DPC hereinafter), and $0.8 \times 10^{-2}$ part of tetramethylammonium hydroxide and $0.6 \times 10^{-4}$ part of sodium hydroxide as catalysts were heated at 180° C. in a nitrogen atmosphere to be molten. Thereafter, the pressure was adjusted to 13.4 kPa over 30 minutes. Then, the temperature was raised up to 250° C. at a temperature elevation rate of 60° C./hr and kept at that temperature for 10 minutes, and then the pressure was reduced to not more than 133 Pa over 1 hour. A reaction was carried out under agitation for a total of 6 hours, a tetrabutyl phosphonium salt of dodecylbenzenesulfonic acid was added in a molar amount 1.5 times larger than the total molar amount of the catalysts after the end of the reaction to deactivate the catalysts, nitrogen was discharged from the bottom of the reaction tank under increased pressure, and the obtained product was cut with a pelletizer to obtain a pellet while it was cooled in a water tank. The evaluation results of the pellet are shown in Table 1.

Example 2

<Production of Polycarbonate Resin>

The operation of Example 1 was repeated to make the same evaluations as in Example 1 except that 2,4-diethyl-1,5-pentanediol (to be abbreviated as DEP hereinafter) was used in place of BEPD. The results are shown in Table 1.

Example 3

<Production of Polycarbonate Resin>

The operation of Example 2 was repeated to make the same evaluations as in Example 2 except that 405 parts of ISS and 104 parts of DEP were used. The results are shown in Table 1.

Example 4

<Production of Polycarbonate Resin>

The operation of Example 2 was repeated to make the same evaluations as in Example 2 except that 451 parts of ISS and 55 parts of DEP were used. The results are shown in Table 1.

Example 5

<Production of Polycarbonate Resin>

The operation of Example 1 was repeated to make the same evaluations are in Example 1 except that 3-methyl-1,5-pentanediol (to be abbreviated as MPD hereinafter) was used in place of BEPD. The results are shown in Table 1.

Example 6

<Production of Polycarbonate Resin>

The operation of Example 3 was repeated to make the same evaluations as in Example 3 that 77 parts of MPD was used in place of DEP. The results are shown in Table 1.

Example 7

<Production of Polycarbonate Resin>

The operation of Example 1 was repeated to make the same evaluations as in Example 1 except that 250 parts of ISS, 101 parts of MPD and 266 parts of 1,1-bis(4-hydroxyphpenyl)-3,3,5-trimethylcyclohexane (to be abbreviated as TMC hereinafter) were used. The results are shown in Table 1.

Comparative Example 1

<Production of Polycarbonate Resin>

The operation of Example 1 was repeated to make the same evaluations as in Example 1 except that 501 parts of ISS and 749.7 parts of DPC were used as raw materials. The results are shown in Table 1.

Comparative Example 2

<Production of Polycarbonate Resin>

The operation of Example 1 was repeated to make the same evaluation as in Example 1 except that 376 parts of ISS, 65 parts of 1,3-propanediol (to be abbreviated as PD hereinafter) and 750 parts of DPC were used as raw materials. The results are shown in Table 1.

Comparative Example 3

<Production of Polycarbonate Resin>

The operation of Example 1 was repeated to make the same evaluations as in Example 1 except that 400 parts of ISS, 71 parts of 1,5-pentanediol (to be abbreviated as PeD hereinafter) and 750 parts of DPC were used as raw materials. The results are shown in Table 1.

Comparative Example 4

<Production of Polycarbonate Resin>

The operation of Example 1 was repeated to make the same evaluations as in Example 1 except that 426 parts of ISS, 118 parts of 1,6-hexanediol (to be abbreviated as HD hereinafter) and 750 parts of DPC were used as raw materials. The results are shown in Table 1.

Comparative Example 5

<Production of Polycarbonate Resin>

The operation of Example 1 was repeated to make the same evaluation as in Example 1 except that 275 parts of ISS, 222 parts of 1,4-cyclohexane dimethanol (to be abbreviated as CHDM hereinafter) and 750 parts of DPC were used as raw materials. The results are shown in Table 1.

TABLE 1

| | Composition | Composition ratio | Specific viscosity | Tg (°C.) | HDT (°C.) | Water absorption coefficient (%) | TW value | Pencil hardness | Boiling water resistance test |
|---|---|---|---|---|---|---|---|---|---|
| Ex. 1 | ISS/BEPD | 85/15 | 0.357 | 120 | 106 | 1.4 | 3.4 | H | ○ |
| Ex. 2 | ISS/DEP | 85/15 | 0.353 | 121 | 106 | 1.9 | 2.9 | H | ○ |
| Ex. 3 | ISS/DEP | 81/19 | 0.362 | 107 | 93 | 1.4 | 2.9 | H | Δ |
| Ex. 4 | ISS/DEP | 90/10 | 0.363 | 131 | 116 | 2.2 | 3.0 | H | ○ |
| Ex. 5 | ISS/MPD | 85/15 | 0.349 | 124 | 109 | 2.1 | 2.9 | H | ○ |
| Ex. 6 | ISS/MPD | 81/19 | 0.352 | 108 | 94 | 1.7 | 2.6 | H | Δ |
| Ex. 7 | ISS/MPD/TMC | 50/25/25 | 0.361 | 111 | 97 | 0.7 | 3.7 | HB | ○ |
| C. Ex. 1 | ISS | 100 | 0.338 | 160 | 144 | 5.3 | 1.1 | H | x |
| C. Ex. 2 | ISS/PD | 75/25 | 0.357 | 116 | 100 | 2.4 | 2.2 | F | x |
| C. Ex. 3 | ISS/PeD | 80/20 | 0.349 | 125 | 108 | 2.8 | 2.2 | H | x |
| C. Ex. 4 | ISS/HD | 85/15 | 0.351 | 125 | 110 | 3.0 | 2.0 | H | x |
| C. Ex. 5 | ISS/CHDM | 60/40 | 0.353 | 110 | 93 | 1.9 | 2.5 | HB | x |

Ex.: Example
C. Ex.: Comparative Example

In Table 1, BEPD means 2-n-butyl-2-ethyl-1,3-propanediol, DEP 2,4-diethyl-1,5-pentanediol, MPD 3-methyl-1,5-pentanediol, PD 1,3-propanediol, PeD 1,5-pentanediol, HD 1,6-hexanediol and CHDM 1,4-cyclohexane dimethanol, and ISS means an isosorbide derivative which is a diol component of a recurring unit.

Examples 8 to 13 and Comparative Examples 6 to 10

The resins and evaluation methods used in Examples 8 to 13 and Comparative Examples 6 to 10 are as follows.

1. Polymer Composition Ratio (NMR)

The recurring units were measured by the proton NMR of the JNM-AL400 of JEOL Ltd. to calculate the polymer composition ratio (molar ratio).

2. Measurement of Specific Viscosity

The specific viscosity was obtained from a solution prepared by dissolving 0.7 g of the polycarbonate resin in 100 ml of methylene chloride at 20° C. by using an Ostwald viscometer.

Specific viscosity$(\eta_{sp}) = (t-t_0)/t_0$

[$t_0$ is the number of seconds required for the dropping of methylene chloride and t is the number of seconds required for the dropping of a sample solution]

3. Measurement of Glass Transition Temperature (Tg)

8 mg of the polycarbonate resin was used to measure its glass transition temperature in a nitrogen atmosphere (nitrogen flow rate: 40 ml/min) and a temperature elevation rate of 20° C./min by using the DSC-2910 thermal analyzing system of TA Instruments in accordance with JIS K7121.

4. Pencil Hardness

The pellet was molded into a 2 mm-thick square plate at a cylinder temperature of 250° C., a mold temperature of 80° C. and a one-minute cycle by using the J85-ELIII injection molding machine of The Japan Steel Works, Ltd. so as to measure its pencil hardness in accordance with ?? testing method specified in JIS K5600.

5. Water Absorption Coefficient (Wa)

The water absorption coefficient (Wa) was obtained from the following equation by measuring an increase in the weight of a 200 μm-thick cast film obtained by dissolving a pellet of the polycarbonate resin in methylene chloride and evaporating methylene chloride after it was dried at 100° C. for 12 hours and immersed in 25° C. water for 48 hours.

Water absorption coefficient(%)={(weight of resin after water absorption–weight of resin before water absorption)/weight of resin before water absorption}×100

6. Photoelastic Constant

The photoelastic constant was measured with the Spectro-ellipsometer M-220 of JASCO Corporation by cutting out a test specimen having a length of 50 mm and a width of 10 mm from the above film.

7. TW Value

The TW value was obtained from the following equation.

TW value=glass transition temperature(Tg)×0.04– water absorption coefficient(Wa)

8. Boiling Water Resistance Test

The pellet was molded into a 2 mm-thick plate at a cylinder temperature of 250° C., a mold temperature of 80° C. and a one-minute cycle by means of the J85-ELIII injection molding machine of The Japan Steel Works, Ltd. A pressure cooker test (1 hour of exposure in a steam atmosphere at a temperature of 105° C.) was carried out on this molded plate to evaluate its appearance after the pressure cooker test. The boiling water resistance was evaluated as X when the molded plate was significantly whitened or deformed, Δ when the molded plate was slightly whitened or deformed, and ○ when whitening and deformation were not seen.

Example 8

409 parts of isosorbide (to be abbreviated as ISS hereinafter), 101 parts of 2,2,4,4-tetramethyl-1,3-cyclobutanediol (to be abbreviated as TMCB hereinafter), 750 parts of diphenyl carbonate (to be abbreviated as DPC hereinafter), and 0.8× $10^{-2}$ part of tetramethylammonium hydroxide and 0.6×$10^{-4}$ part of sodium hydroxide as catalysts were heated at 180° C. in a nitrogen atmosphere to be molten. Thereafter, the pressure was adjusted to 13.4 kPa over 30 minutes. Then, the temperature was raised up to 250° C. at a temperature elevation rate of 60° C./hr and kept at that temperature for 10 minutes, and then the pressure was reduced to not more than 133 Pa over 1 hour. A reaction was carried out under agitation for a total of 6 hours, a tetrabutyl phosphonium salt of dodecylbenzenesulfonic acid was added in a molar amount 2 times larger than the total molar amount of the catalysts after the end of the reaction to deactivate the catalysts, nitrogen was discharged from the bottom of the reaction tank under increased pressure, and the obtained product was cut with a pelletizer to obtain a pellet while it was cooled in a water tank. The evaluation results are shown in Table 2.

Example 9

The operation of Example 8 was repeated to make the same evaluations as in Example 8 except that 460 parts of ISS, 50 parts of TMCB and 750 parts of DPC were used as raw materials. The results are shown in Table 2.

Example 10

The operation of Example 8 was repeated to make the same evaluation as in Example 8 except that 307 parts of ISS, 202 parts of TMCB and 750 parts of DPC were used as raw materials. The results are shown in Table 2.

Example 11

The operation of Example 8 was repeated to make the same evaluations as in Example 8 except that 358 parts of ISS, 76 parts of TMCB, 62 parts of 1,6-hexanediol (to be abbreviated as HD hereinafter) and 750 parts of DPC were used as raw materials. The results are shown in Table 2.

Example 12

The operation of Example 8 was repeated to make the same evaluations as in Example 8 except that 358 parts of ISS, 76 parts of TMCB, 76 parts of 1,4-cyclohexane dimethanol (to be abbreviated as CHDM hereinafter) and 750 parts of DPC were used as raw materials. The results are shown in Table 2.

Example 13

The operation of Example 8 was repeated to make the same evaluations as in Example 8 except that 358 parts of ISS, 76 parts of TMCB, 120 parts of bisphenol A (to be abbreviated as BPA hereinafter) and 750 parts of DPC were used as raw materials. The results are shown in Table 2.

Comparative Example 6

The operation of Example 8 was repeated to make the same evaluations as in Example 8 except that 511 parts of ISS and 750 parts of DPC were used as raw materials. The results are shown in Table 2.

Comparative Example 7

The operation of Example 8 was repeated to make the same evaluations as in Example 8 except that 435 parts of ISS, 60 parts of HD and 750 parts of DPC were used as raw materials. The results are shown in Table 2.

Comparative Example 8

The operation of Example 8 was repeated to make the same evaluations as in Example 8 except that 307 parts of ISS, 202 parts of CHDM and 750 parts of DPC were used as raw materials. The results are shown in Table 2.

Comparative Example 9

The operation of Example 8 was repeated to make the same evaluations as in Example 8 except that 250 parts of ISS, 391 parts of BPA and 750 parts of DPC were used as raw materials. The results are shown in Table 2.

Comparative Example 10

The operation of Example 8 was repeated to make the same evaluations as in Example 8 except that 145 parts of 1,1-bis (4-hydroxyphenyl)-1-phenylethane (to be abbreviated as BP-AP hereinafter), 72 parts of TMCB and 214 parts of DPC were used as raw materials. The results are shown in Table 2.

TABLE 2

| | Composition mol | Specific viscosity — | Tg °C. | Pencil hardness — | Water absorption coefficient % | Photoelastic constant $10^{-12}Pa^{-1}$ | TW value — | Boiling water resistance test — |
|---|---|---|---|---|---|---|---|---|
| Ex. 8 | ISS/TMCB | 80/20 | 0.534 | 153 | 2H | 2.2 | 9 | 3.9 | o |
| Ex. 9 | ISS/TMCB | 90/10 | 0.541 | 158 | H | 2.4 | 8 | 3.9 | o |
| Ex. 10 | ISS/TMCB | 60/40 | 0.528 | 148 | 2H | 1.8 | 7 | 4.1 | o |
| Ex. 11 | ISS/TMCB/HD | 70/15/15 | 0.349 | 120 | H | 1.5 | 11 | 3.3 | o |
| Ex. 12 | ISS/TMCB/CHDM | 70/15/15 | 0.353 | 125 | H | 1.8 | 13 | 3.2 | o |
| Ex. 13 | ISS/TMCB/BPA | 70/15/15 | 0.358 | 152 | H | 1.1 | 15 | 5.0 | o |
| C. Ex. 6 | ISS homo | 100 | 0.338 | 160 | H | 5.3 | 14 | 1.1 | x |
| C. Ex. 7 | ISS/HD | 85/15 | 0.351 | 125 | H | 3.0 | 17 | 2.0 | x |
| C. Ex. 8 | ISS/CHDM | 60/40 | 0.353 | 110 | HB | 1.9 | 22 | 2.5 | x |
| C. Ex. 9 | ISS/BPA | 50/50 | 0.363 | 153 | B | 1.1 | 40 | 5.0 | o |
| C. Ex. 10 | BP-AP/TMCB | 50/50 | 0.355 | 150 | 2H | 0.5 | 38 | 5.5 | o |

Ex.: Example
C. Ex.: Comparative Example

Effect of the Invention

The polycarbonate resin of the present invention is excellent in heat resistance, boiling water resistance and surface hardness and has a low water absorption coefficient.

Industrial Applicability

The polycarbonate resin of the present invention can be used in a wide variety of fields such as injection molded electric and electronic parts and auto parts, films, sheets, construction materials, bottles, containers, lenses including camera lenses, finder lenses, and CCD and CMOS lenses, films and sheets including phase difference films, diffusion sheets and polarizing films for use in liquid crystal and plasma displays, optical disks, optical materials, optical parts, and binders for fixing coloring matter and charge transfer agents.

The invention claimed is:

1. A polycarbonate resin comprising a unit (A) represented by the following formula (A) and a unit (B) represented by the following formula (B) as main recurring units, wherein a molar ratio (A/B) of the unit (A) to the unit (B) is 30/70 to 99/1,

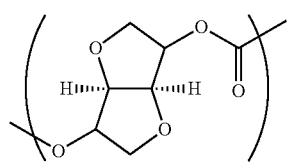

(A)

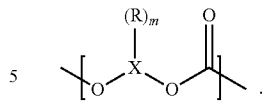

(B)

wherein in unit (B),
(i) —X{—(R)$_m$}— is a 2-n-butyl-2-ethyl-1,3-propanediyl group 2,4-diethyl-1,5-pentanediyl group or a 3-methyl-1,5-pentanediyl group; or
(ii) X is a cycloalkylene group having 3 to 20 carbon atoms and R is an alkyl group having 1 to 20 carbon atoms or a cycloalkyl group having 3 to 20 carbon atoms, and "m" is an integer of 1 to 10.

2. The polycarbonate resin according to claim 1, wherein a number of carbon atoms (main-chain carbon atoms) of X and a number of carbon atoms (side-chain carbon atoms) of (R)$_m$ in the unit (B) satisfy the following expression (i), $$0.3 \leq (\text{number of main-chain carbon atoms})/(\text{number of side-chain carbon atoms}) \leq 8 \quad (i).$$

3. The polycarbonate resin according to claim 1, wherein a total number of carbon atoms of the unit (B) is 4 to 12.

4. The polycarbonate resin according to claim 1, wherein, in the unit (B), R is an alkyl group having 1 to 10 carbon atoms, and "m" is 3 to 12.

5. The polycarbonate resin according to claim 1, wherein the unit (B) is a unit (B1) represented by the following formula,

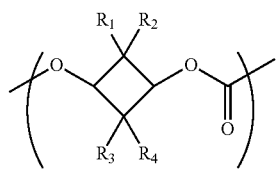

(B1)

wherein $R_1$, $R_2$, $R_3$ and $R_4$ are alkyl groups having 1 to 3 carbon atoms which may be the same or different, a total number of carbon atoms of $R_1$ to $R_4$ is 4 to 10, and $R_1$ and $R_2$, and $R_3$ and $R_4$ may be bonded together to form a carbon ring.

6. The polycarbonate resin according to claim 1, wherein the unit (B) is a unit (B2) represented by the following formula,

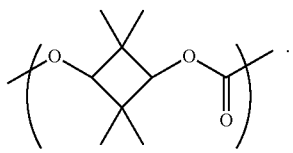

(B2)

7. The polycarbonate resin according to claim 1 which has a specific viscosity ($\eta_{sp}$) measured by using a 20° C. methylene chloride solution of 0.2 to 1.5.

8. The polycarbonate resin according to claim 1 which has a glass transition temperature of 70 to 160° C.

9. The polycarbonate resin according to claim 1 which has a saturation water absorption coefficient of not more than 2.5%.

10. The polycarbonate resin according to claim 1, wherein a relationship between a glass transition temperature (Tg° C.) and a water absorption coefficient (Wa %) of the polycarbonate resin satisfies the following expression (ii), $$2.5 \leq TW \text{ value} = Tg \times 0.04 - Wa \qquad \text{(ii)}.$$

11. The polycarbonate resin according to claim 1 which has a pencil hardness of F to 4H.

12. A molded article formed from the polycarbonate resin of claim 1.

13. A film formed from the polycarbonate resin of claim 1.

\* \* \* \* \*